UNITED STATES PATENT OFFICE.

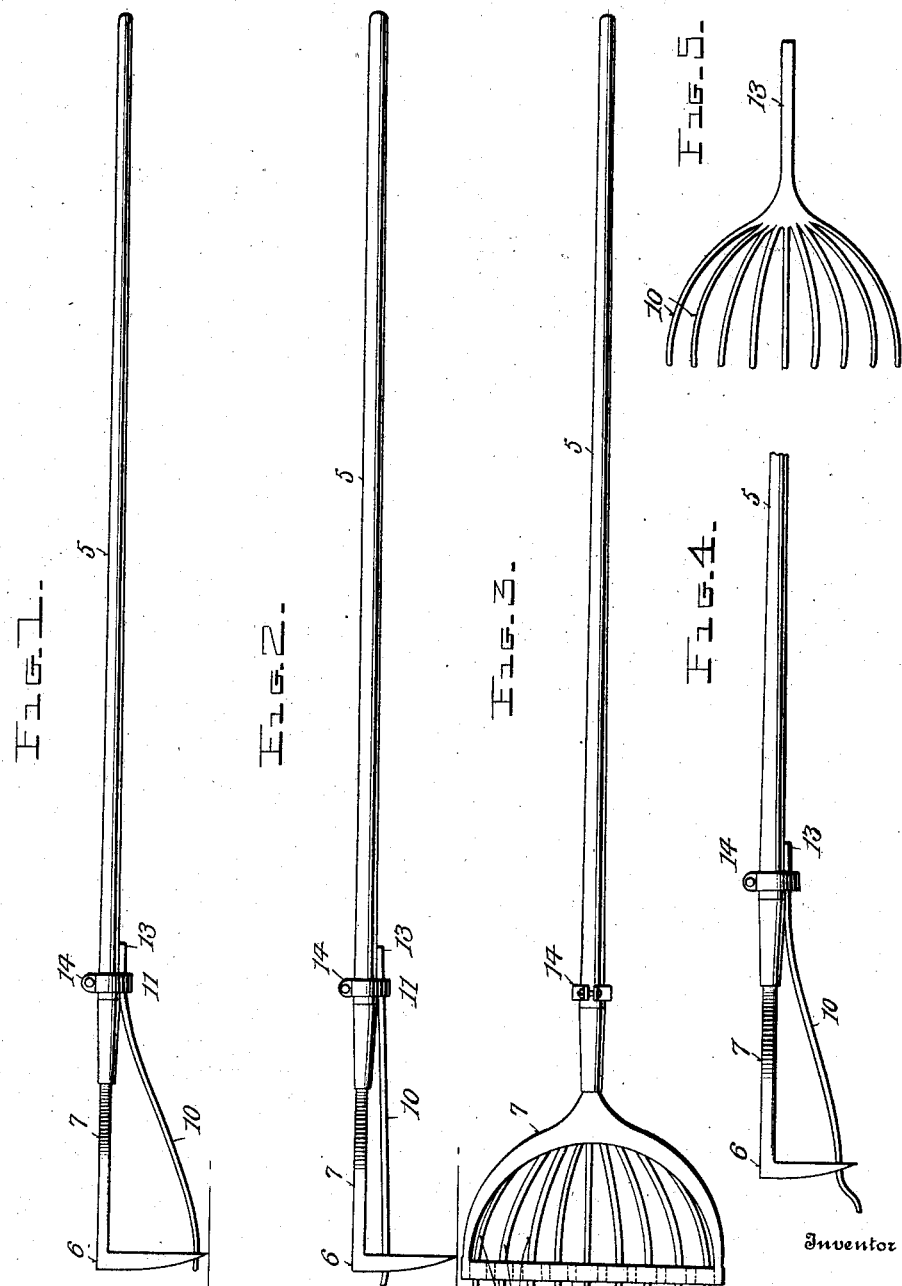

JOHN L. KUMMER, OF COLD SPRING, MINNESOTA.

RAKE.

No. 902,238.  Specification of Letters Patent.  Patented Oct. 27, 1908.

Application filed May 9, 1908. Serial No. 431,839.

*To all whom it may concern:*

Be it known that I, JOHN L. KUMMER, a citizen of the United States, residing at Cold Spring, in the county of Stearns, State of Minnesota, have invented certain new and useful Improvements in Rakes; and I do hereby declare the following to be a full, clear, and exact description of the invention, such as will enable others skilled in the art to which it appertains to make and use the same.

This invention relates to rakes in general and more particularly to that class of rakes used for raking grass after it has been cut upon a lawn, although it may be understood from the following description that the principles involved may be embodied in a rake for a variety of purposes.

The object of the invention is to provide a cheap and simple construction wherein each time the rake is raised from the surface of the ground, the teeth thereof will be cleared of leaves, grass or whatever else may be clinging to them.

In the drawings forming a portion of this specification and in which like numerals of reference indicate similar parts in the several views, Figure 1 is a side elevation showing a rake embodying the present invention. Fig. 2 is a view similar to Fig. 1 with the clearer pressed back to the position that it assumes during the raking operation. Fig. 3 is a top plan view. Fig. 4 is a side elevation showing a somewhat modified construction. Fig. 5 is a plan view of the clearing device.

Referring now to the drawings, there is shown a rake comprising a handle 5, a head 6 from which depend the usual tangs, the head being connected to the handle by means of a yoke 7 provided with a ferrule in which the handle is received in the usual manner.

The clearing device which is secured to the handle of the rake directly adjacent to the ferrule consists of a number of fingers 10, that project or radiate from a common base as illustrated in Fig. 5 of the drawings, there being a number of fingers corresponding to the spaces between the teeth. From the support of the clearer there extends a stem portion 13 of spring material, and this stem portion is secured by a clamp 14 or in any other suitable manner, directly against the lower face of the handle of the rake in position with the fingers between the teeth of the rake.

The normal position of the clearing attachment is with the fingers at the lower or free ends of the rake teeth, it being understood of course that when the rake is in use, grass or other matter that is caught by the teeth, forces the clearing fingers upwardly to the required extent. As soon as the rake is raised from the ground, the spring quality of the stem 13 serves to move the clearing fingers downwardly to the ends of the teeth of the rake, thereby forcing from the teeth any material that may be clinging to them. In this manner, the teeth of the rake are cleared of all matter and the efficiency of the rake is in no wise diminished.

In Fig. 4 of the drawings there is shown a modification wherein the extremities of the clearing fingers are continued to some extent beyond the teeth of the rake and then downwardly, so that in the raking operation, the extremities of these fingers will bear upon the ground and the clearing fingers will thus be forced positively in an upward direction to permit ready engagement of the teeth of the rake with the material to be raked.

It will be understood that in practice various modifications may be made and any suitable material and proportions used for the various parts without departing from the spirit of the invention.

What is claimed is—

1. The combination with a rake including a head provided with teeth and a handle, of a clearing device consisting of a plurality of fingers having a spring stem secured against the lower face of the handle, the extremities of the fingers passing between the rake teeth and bent therebeyond in a downwardly direction, the spring stem being so constructed and positioned as normally to hold the portion of the fingers lying directly between the teeth at the lower end of said teeth and to permit movement of the fingers to the upper end of the teeth.

2. In a device of the kind described, a handle, an arcuate yoke extending from said handle provided with a cross-bar connecting the ends of the yoke, rake teeth extending downwardly from said cross bar, a spring member attached to said handle, a series of clearing fingers formed on said spring member having their outer ends between the rake teeth, said fingers all lying within the limits of the periphery of said yoke and normally having their ends positioned near the points of the rake teeth.

In testimony whereof, I affix my signature, in presence of two witnesses.

JOHN L. KUMMER.

Witnesses:
NIC. WENNER,
P. J. THEISEN.